SAMUEL TRUMBORE.
Pipe Joint.
No. 123,954.    Patented Feb. 20, 1872.
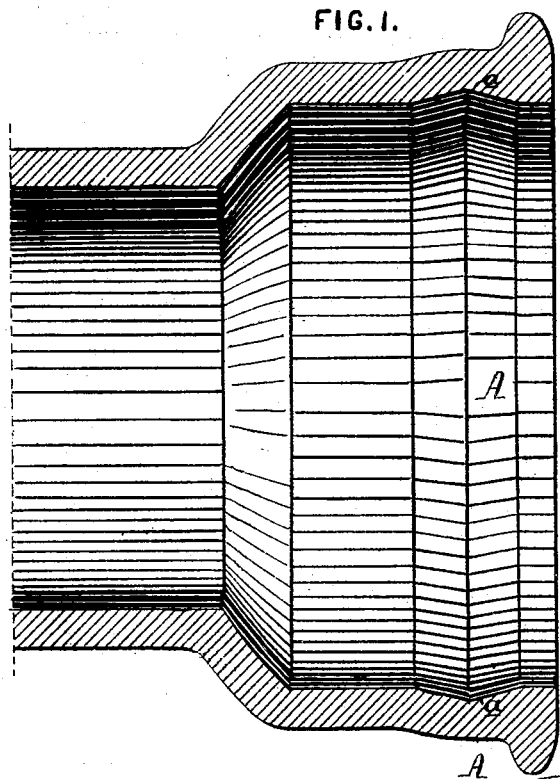
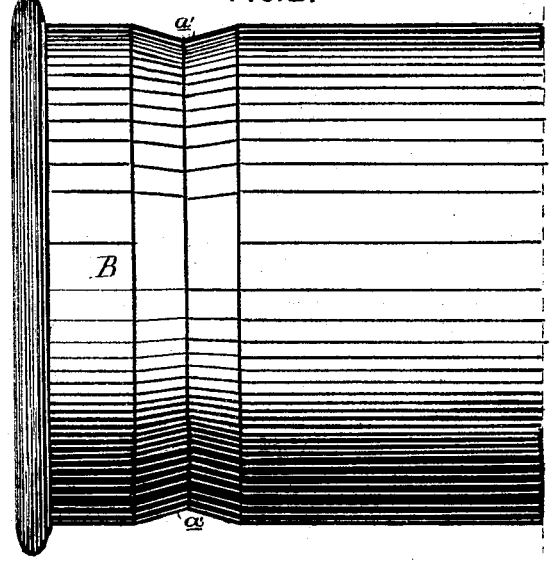
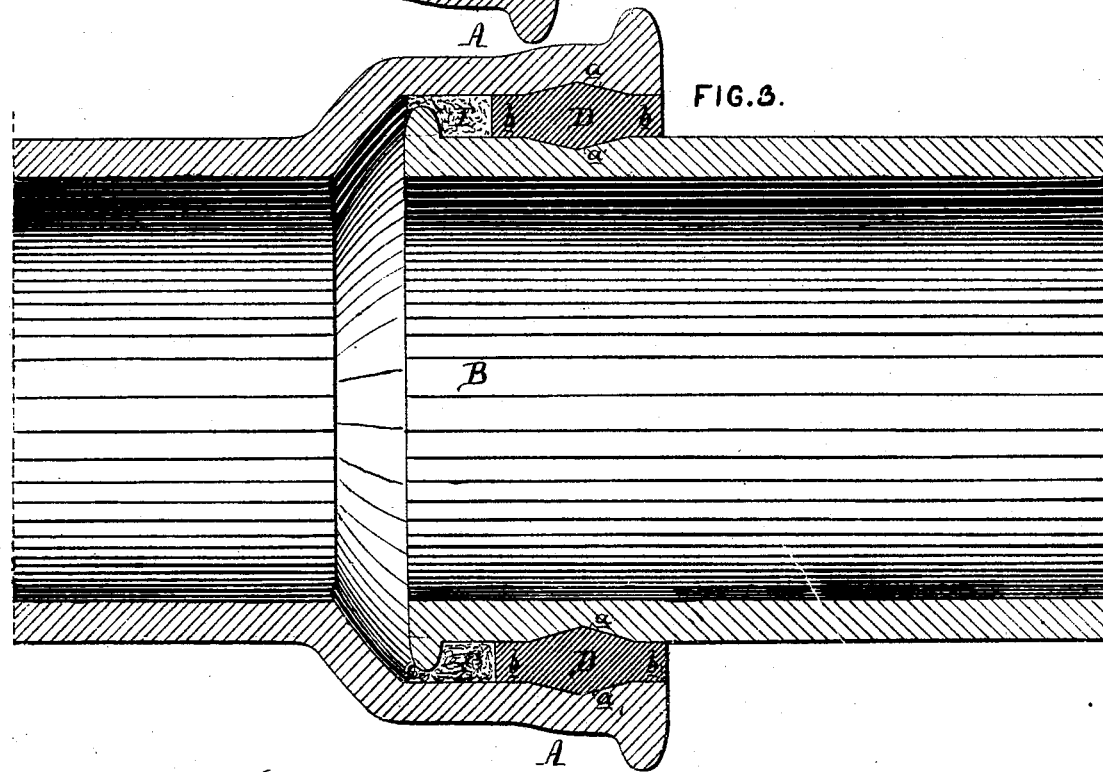
WITNESSES  
N. H. Hildebrand  
Ignatius Buck  
Samuel Trumbore 123,954

UNITED STATES PATENT OFFICE.

SAMUEL TRUMBORE, OF EASTON, ASSIGNOR TO HIMSELF AND B. E. LEHMAN, OF BETHLEHEM, PENNSYLVANIA.

IMPROVEMENT IN PIPE-JOINTS.

Specification forming part of Letters Patent No. 123,954, dated February 20, 1872.

Specification describing an Improved Joint for Gas or Water Pipes, invented by SAMUEL TRUMBORE, of Easton, Northampton county, Pennsylvania.

*Improved Joint for Gas or Water Pipes.*

My invention consists of a joint for gas or water pipes, too fully explained hereafter to need preliminary description, and designed with the view of preventing the leakage which usually occurs in consequence of the expansion and contraction of the pipes.

In the accompanying drawing, Figures 1 and 2 are sectional and exterior views of the ends of two pipes arranged to be joined together in accordance with my invention; and Fig. 3 is a sectional view, showing the joint completed.

A represents the enlarged or bell-mouthed end of one pipe, and B the spigot end of an adjoining pipe, arranged to be fitted into the bell and to be secured to the same by a water or gas tight joint or packing.

The usual lead joints are objectionable, inasmuch as they are apt to become loosened and leaky, in consequence of the expansion and contraction of the pipes, this being especially noticeable with gas-pipes in the winter-season, when, owing to the great contraction of the metal and consequent opening of the joints, there is frequently a loss of as much as fifteen per cent. of the whole quantity of gas admitted into the pipes.

I have overcome this objection by the use of a double wedge-shaped joint or packing, D, of lead or other soft metal, cast into the space between the two pipes and backed by a mass of hemp, F, previously rammed into the space, as usual. (See Fig. 3.) In order to produce this joint, a double-inclined recess or groove, $a$, Fig. 1, is formed within the bell A, and a corresponding groove, $a'$, Fig. 2, upon the exterior of the pipe B, the grooves being formed at such points that when the pipes are fitted together the said grooves shall be directly opposite each other, as shown. The lead, when poured into the space between the pipes, enters these grooves and forms the above-described packing D. This packing, being inclined or wedge-shaped in both directions, will, owing to the longitudinal movement of the pipes in expanding or contracting, become tightly jammed into the space between the latter, and will, therefore, prevent any leakage which might occur in consequence of either the longitudinal or transverse expansion or contraction of the said pipes. The straight portions $b\ b$ of the packing, at either side of the double-inclined portion, acts with the latter in the same manner as the usual packing, to prevent leakage under ordinary circumstances.

I claim—

A pipe-joint in which the open bell-mouth of one section is recessed internally at $a$ and the internal pipe is recessed externally at $a'$, immediately opposite the recess $a$, and the intervening space is filled with lead and caulked, as shown and described.

In testimony whereof I have signed my name to this specification in the presence of two subscribing witnesses.

SAMUEL TRUMBORE.

Witnesses:
W. H. HILDEBRAND,
IGNATIUS BUCK.